United States Patent

Eshleman

Patent Number: 5,725,722
Date of Patent: Mar. 10, 1998

[54] HOT-MELT APPLICATOR TIP

[75] Inventor: J. Michael Eshleman, Manheim, Pa.

[73] Assignee: Armstrong World Industries, Inc., Lancaster, Pa.

[21] Appl. No.: 563,206

[22] Filed: Nov. 27, 1995

[51] Int. Cl.$^6$ ................................. B23K 11/08
[52] U.S. Cl. .................. 156/502; 156/538; 156/578; 156/304.6; 401/266; 222/146.5; 239/599; 239/601; 425/458; 219/230
[58] Field of Search ............................ 156/304.1, 304.6, 156/304.7, 356, 502, 578, 538, 304.4, 309.9; 239/599, 601; 222/146.2, 146.5; 401/261, 266; 425/87, 458; 219/227, 229, 230

[56] References Cited

U.S. PATENT DOCUMENTS

| | | | |
|---|---|---|---|
| 4,536,244 | 8/1985 | Greci et al. | 156/304.4 |
| 4,916,289 | 4/1990 | Suhanek | 219/230 |
| 5,055,156 | 10/1991 | Marino et al. | 156/499 |

FOREIGN PATENT DOCUMENTS

| | | |
|---|---|---|
| 0545609 | 6/1993 | European Pat. Off. . |
| 848967 | 9/1960 | United Kingdom . |
| 971526 | 9/1964 | United Kingdom . |
| 1262422 | 2/1972 | United Kingdom . |
| 2037654 | 7/1980 | United Kingdom . |
| 2283937 | 10/1994 | United Kingdom . |

*Primary Examiner*—Michael W. Ball
*Assistant Examiner*—Sam Chuan Yao

[57] ABSTRACT

A method is disclosed for sealing and bonding the seams and edges of resilient and other types of floors, whereby specially formulated hot-melt sealants/adhesives are applied in molten form at the flooring installation site using a heated gun equipped with a specially designed tip. The hot-melt sealant/adhesive flows into and completely fills the seam and bonds to the edges of the flooring producing a bead of material that extends above the surface of the flooring. The specially designed tip facilitates this process by guiding along easily in the groove of the seam or joint and directing the molten sealant/adhesive accurately into the seam. The tip allows the seam or joint width to be very narrow and enhances sealing and adhesion by imparting heat to the edges of the flooring material. Upon cooling, a spatula knife or other appropriate tool is used to skive off the excess bead of material leaving it flush with the flooring. The appropriately pigmented sealant/adhesive produces an appearance that is barely noticeable from the surrounding floor.

1 Claim, 3 Drawing Sheets

HOT-MELT APPLICATOR TIP

FIELD OF THE INVENTION

The present invention relates to a process for the sealing and bonding of seams or joints of resilient floor coverings. More particularly, the invention relates to a hot-melt seaming or bonding process. The present invention also relates to the floor covering system produced by the method and the preferred hot-melt gun or applicator tip used in the method.

BACKGROUND OF THE INVENTION

Seams and joints of floor coverings are sealed and bonded to keep out moisture and dirt and to impart strength. Seam sealing or bonding systems presently used in the prior art involve the use of environmentally dangerous chemicals, expensive high temperature equipment, or porous grouting materials.

Most floors have seams or joints at regular intervals. These seams can be bonded or sealed or left alone. Sealing of seams is usually preferred because it keeps dirt, spills and cleaning solutions from penetrating into the seam. Foreign matter which penetrates into the seam can interfere with the adhesion of the floor covering to the substrate, produce an undesirable appearance, or foster bacterial growth.

The sealing methods most commonly used are the grouting of rigid tile, the bonding of resilient floors to the subfloor with strong impervious adhesives, the welding of PVC based resilient floors using very high temperatures and threads of PVC inserted into specially cut grooves, and the use of PVC resins dissolved in strong solutions forming lacquers that partially dissolve the PVC flooring forming a solvent weld. Each of these systems has its drawbacks and the floor covering industry is always looking for faster, easier, less expensive, and less dangerous ways to seal or bond seams.

SUMMARY OF THE INVENTION

According to the present invention, seams of floor covering materials can be sealed or bonded using a hot molten sealer applied with a heated gun or applicator employing a specially designed tip.

DETAILED DESCRIPTION OF THE INVENTION

The invention is described with respect to floor coverings and particularly resilient polyvinylchloride floor coverings. However, the invention also applies to resilient floor coverings in general, but not to carpeting. Further, the invention is not limited to monolithic resilient floor coverings, but can be used with multi-layered laminates including those with felt or fiber backings. The hot-melt seam sealing system could be used to bond rubber covering elements together.

Hot-melt seam sealing is best performed by, but not limited to, employing an ethylene-vinyl acetate (EVA) copolymer hot-melt material. EVA material, particularly when mixed with an aliphatic hydrocarbon, is flexible, has a low viscosity, bonds well, has good light stability, and does not discolor with exposure to heat.

The bond strength of the EVA material improves substantially when an ethylene/(meth)acrylic acid copolymer, a propylene/(meth)acrylic acid copolymer, or calcium carbonate is added to the composition. (Meth)acrylic acid means acrylic acid or methacrylic acid. The calcium carbonate should be 325 U.S. mesh or smaller.

Other hot-melt materials which have been used successfully include polyamides, and polyethylene or polypropylene modified by the addition of a tackifier. Obviously the hot-melt material can include pigments to form a colored seam.

In one preferred embodiment the hot-melt material is an ethylene/vinyl acetate copolymer to which a tackifier was added. The primary purpose to the tackifier is to improve adhesion, but it also improves flexibility.

Typical hot-melt guns operate at about 380° F. which with the properly designed tip can pass a significant amount of heat to the edges of the flooring elements which are being seam sealed, thereby enhancing the bond. The hot-melt material should flow through the gun and the tip with only moderate effort when molten and should be fluid enough to fill the seam from the bottom of the floor covering elements to slightly overflowing.

Figure 1:
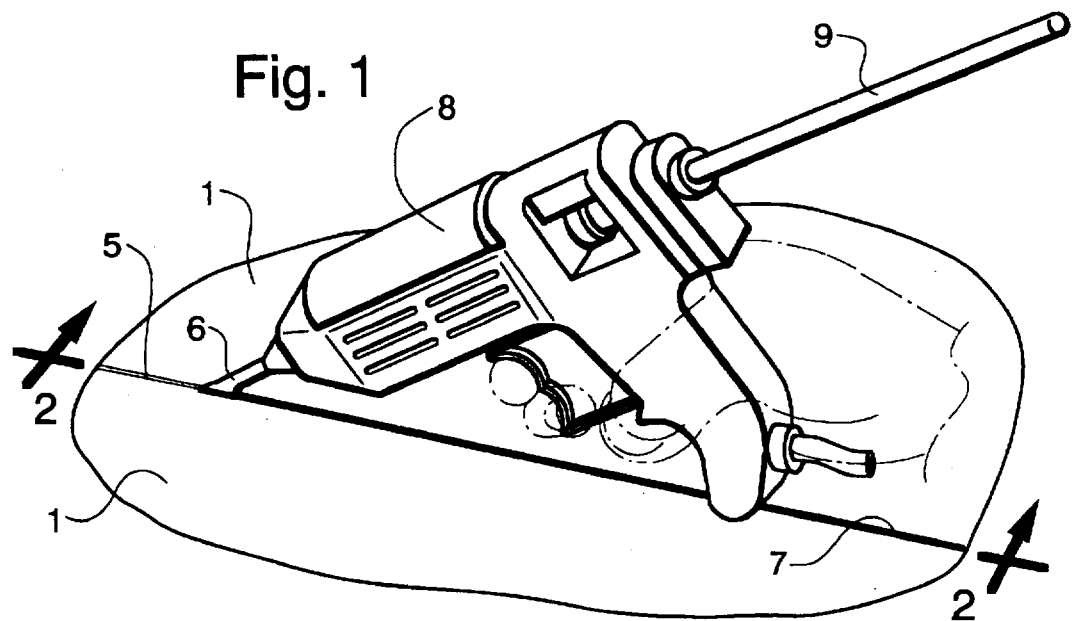
FIG. 1 is a perspective view of two floor covering elements being hot-melt seam sealed in accordance with the present invention.

As shown in FIG. 1, the seam is formed by placing the flooring elements 1, such as tile or sheet goods, a set distance apart using a gauge. The best performance has been achieved in, but is not limited to, the range of about 15 mils to about 40 mils. The flooring materials are preferably affixed to the subfloor 2 (shown in FIG. 2) when the seam width is set and the seams can then be sealed as a separate operation rather than sealing the seams at a time they are laid on the subfloor.

The molten hot-melt material 3 fills the seam from the subfloor 2 to the surface 4 of the flooring elements. If the flooring elements were welded in accordance with the prior art, the weld rod material would fill approximately the top half of the seam. The adjacent edge portions which form the seam groove do not need to be cut or trimmed as is necessary if they were to be welded. The adjacent edge portions are straight as formed when the flooring elements are cut to size and are substantially parallel.

Figure 2:
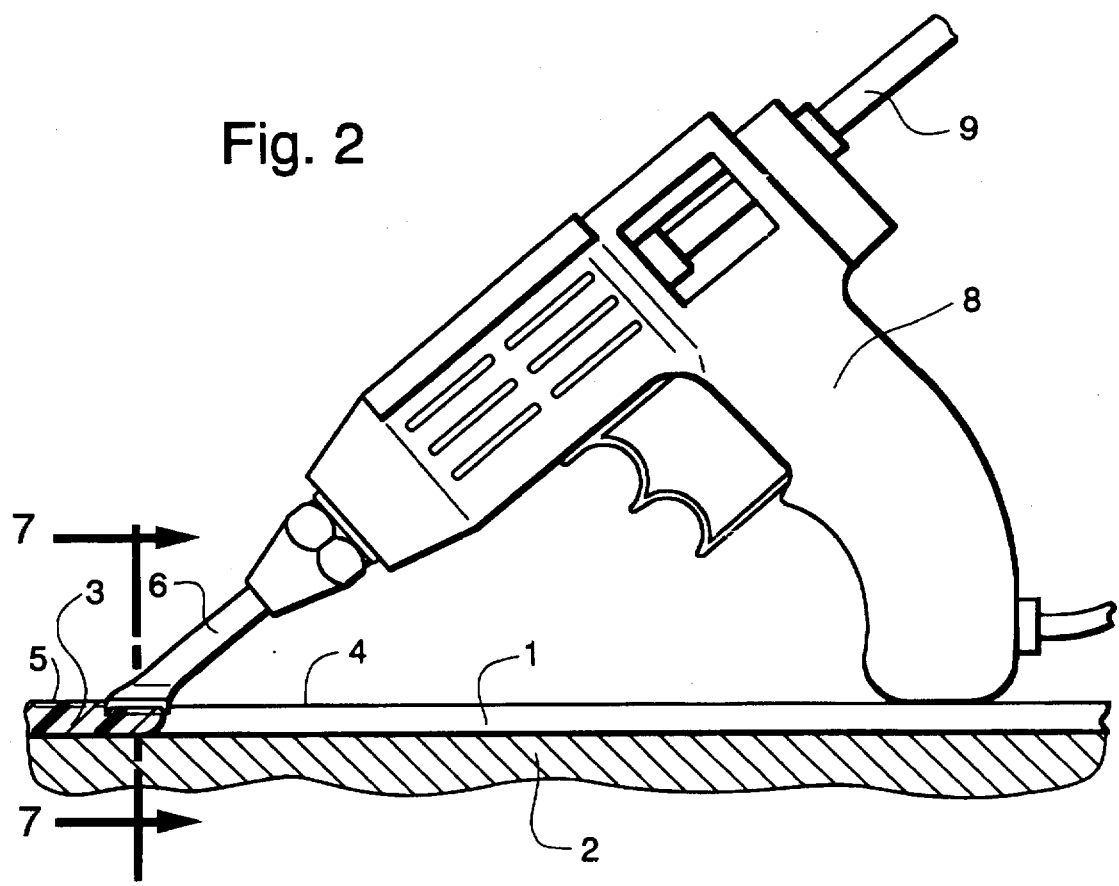
FIG. 2 is a sectional view, taken substantially along line 1—1 of FIG. 1.
Figure 3:
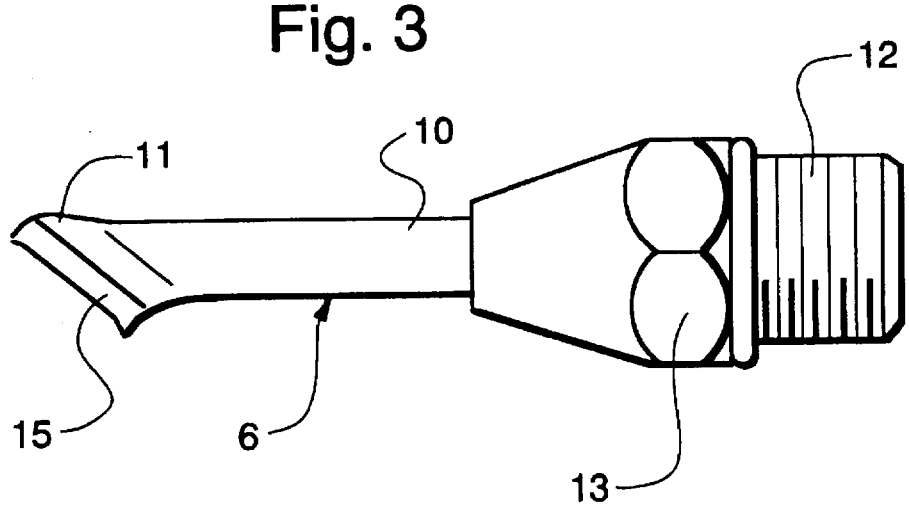
FIG. 3 is a side view of a hot-melt gun tip in accordance with the present invention.
Figure 4:
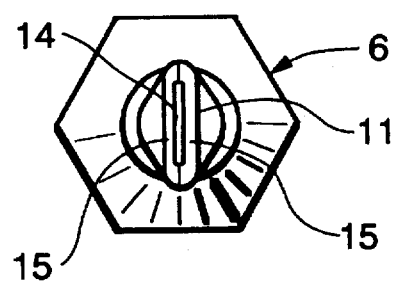
FIG. 4 is a front view of the hot-melt gun tip shown in FIG. 3.
Figure 5:
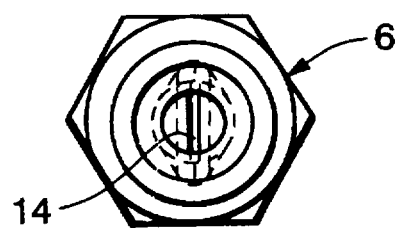
FIG. 5 is a back view of the hot-melt gun tip shown in FIG. 3.
Figure 6:
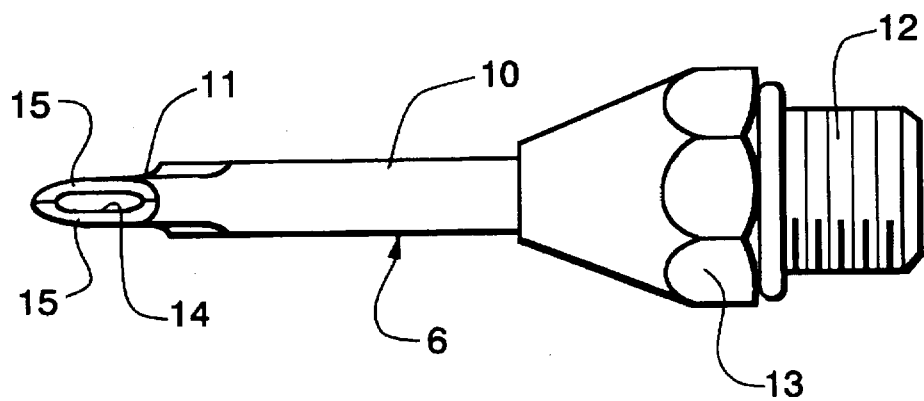
FIG. 6 is a bottom view of the hot-melt gun tip shown in FIG. 3.
Figure 7:
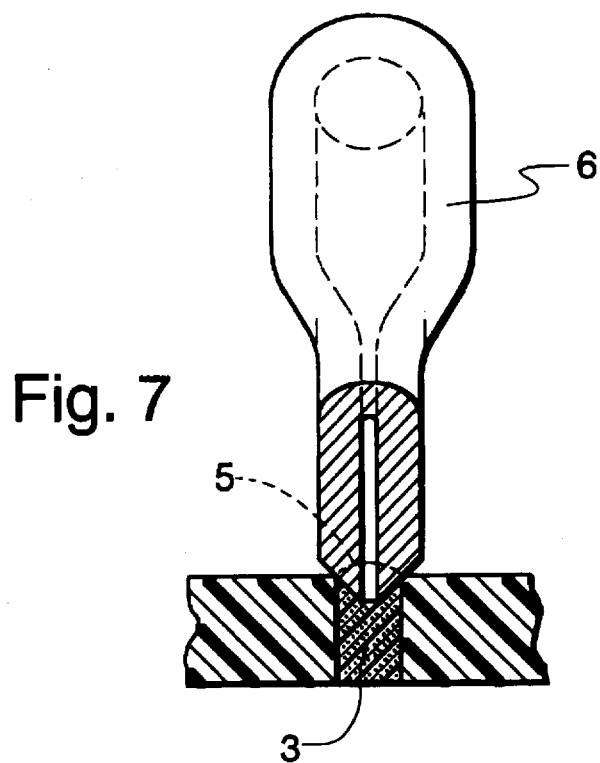
FIG. 7 is a sectional view, taken substantially along line 7—7 of FIG. 1.
Figure 8:
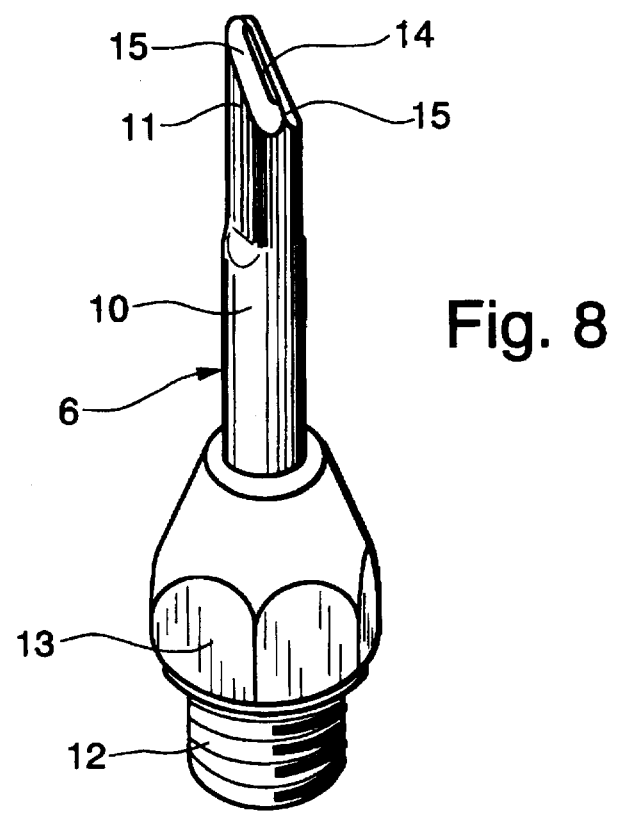
FIG. 8 is a perspective view of the hot-melt gun tip shown in FIG. 3.

The hot-melt material sets up quickly eliminating problems that can occur while waiting for adhesives to cure or solvents to evaporate. The small bead 5 of excess material which is extruded above the top of the seam is easily skived (sliced off) with a spatula-style knife. The bead, which is shown in FIG. 2 and in phantom in FIG. 7, is only slightly wider than the space between the floor elements. The beads of vinyl welded seams are 125 mils wide and are a plasticized polyvinylchloride resin.

As shown in FIG. 1, the specially designed hot-melt gun tip 6 is inserted into the groove of the seam 7 and the hot-melt material is caused to flow into the seam filling the area under the tip to slightly overflowing by hot-melt gun 8.

As the overflow begins to occur, the tip is drawn along the seam maintaining a flow rate that produces the small bead of overflow 5. The rate of movement along the seam is controllable with the flow rate of the hot-melt material 9.

If for some reason the seal should be broken, it can be reestablished by inserting the hot-melt gun tip into the area of the broken seal and applying fresh hot-melt material. The excess is skived off and the seam will be sealed. When sealing intersecting seams, the heat of the applicator tip melts through the already sealed seam with little effort and the new bead of hot-melt material knits the opening after the tip passes through.

Tip design is critical to efficient seam sealing. The tip of the hot-melt gun must direct the molten hot-melt material accurately into the seam. The hot-melt gun should transmit some heat through the tip of the hot-melt gun to the edge portions of the floor covering elements which form inside of the seam to enhance adhesion with the hot-melt material. The tip should be sized so that it is highly maneuverable and controllable.

The tip shown in FIGS. 3 to 8 has performed the best but adequate performance is not limited to this design. The tip 6 is preferably made of bronze, but other metals have performed very well and even engineering grade plastics have been used successfully.

The tip is made from a tubular piece of heat conducting material and includes a shaft portion 10 and a distal end portion 11. The proximal end portion 12 is threaded and has a faced portion 13 to enable easy attachment to the hot-melt gun. The distal end has a slot 14 which is a out 0.01" to about 0.03" wide and about 0.15" to about 0.5" in length. The distal end portion has two beveled surfaces 15, the slot being disposed between the two beveled surfaces. The angle between the two beveled surfaces is about 80° to about 100°. A portion of the two beveled surfaces intersects along a line which forms an angle of about 40° to about 60° from a line perpendicular to the axis of the tubular shaft portion.

The bevelled surfaces help guide the tip within the seam groove without penetrating too deeply into the groove and causing excess drag or making it difficult to fill the seam with hot-melt material. The angle between the intersection of the bevelled surfaces and the axis of the tubular shaft portion enables the slot to be substantially parallel to the surface of the floor covering when the handle of the hot-melt gun is resting on the floor covering, as shown in FIG. 2.

Many formulas have been tried with varying success using a variety of polymers that are frequently incorporated into hot melt coatings or adhesives. Some polyamides were tried with moderate success. Polyethylene wax based formulas were not as strong as desired but using them as modifiers in other formulas was more successful. Block copolymer rubbers may also make good modifiers but their melt index is too low for use in a typical hot melt guns. Polyesters share this same characteristic. Ethylene acrylic acid copolymers produced some useful formulas and bear further investigation. The preferred formula is ethylene vinyl acetate, with and without modifiers.

The following are some of the formulas used for hot melt seam sealing:

| | |
|---|---|
| EVA Resin | 40.0% |
| (18% vinyl acetate, melt index = 500) | |
| EVA Resin (9% vinyl acetate, melt index = 7) | 10.0 |
| Hydrogenated aliphatic hydrocarbon resin | 50.0 |
| (melt point = 85° C.) | |
| | 100.0 |

The above formula has good strength and skiving characteristics along with fair soil resistance.

| | |
|---|---|
| EVA Resin | 70.0% |
| (14% vinyl acetate, melt index = 2500) | |
| Ethylene acrylate copolymer resin | 10.0 |
| (melt point = 51° C.) | |
| Alpha-Methylstyrene resin (melt point = 120° C.) | 20.0 |
| | 100.0 |

The above formula has good strength, good skiving characteristics and fair to good soil resistance.

| | |
|---|---|
| EVA Resin | 60.0% |
| (18% vinyl acetate, melt index = 500) | |
| EVA Resin | 15.0 |
| (28% vinyl acetate, melt index = 6) | |
| Hydrogenated aliphatic hydrocarbon resin | 25.0 |
| (melting point = 130° C.) | |
| | 100.0 |

The above formula has good strength, good skiving characteristics and fair to good soil resistance.

| | |
|---|---|
| EVA Resin | 33.3% |
| (14% vinyl acetate, melt index = 2500) | |
| EVA Resin | 33.3 |
| (33% vinyl acetate, melt index = 400) | |
| EVA Resin | 33.3 |
| (18% vinyl acetate, melt index = 500) | |
| | 99.9 |

The above formula has good strength, good skiving characteristics and fair soil resistance.

| | |
|---|---|
| EVA Resin | 68.0 |
| (18% vinyl acetate, melt index = 600) | |
| EAA Resin (melt index = 312) | 9.0 |
| Hydrogenated aliphatic hydrocarbon resin | 23.0 |
| (melt point = 130° C.) | |
| | 100.0 |

The above formula has very good strength, good skiving characteristics, and good soil resistance.

| | |
|---|---|
| EVA Resin | 50.0% |
| (18% vinyl acetate, melt index = 500) | |
| Hydrogenated aliphatic hydrocarbon resin | 50.0 |
| (melt point = 85° C.) | |
| | 100.0 |

The above formula had fair strength but poor skiving and soiling characteristics. The amount of hydrocarbon resin was too high and the resin had too low a melt point.

| | |
|---|---|
| EVA Resin | 50.0% |
| (18% vinyl acetate, melt index = 500) | |
| EVA Resin | 25.0 |
| (9% vinyl acetate, melt index = 7) | |
| Hydrogenated aliphatic hydrocarbon resin | 25.0 |
| (melt point = 130° C.) | |
| | 100.0 |

The above formula had poor strength and poor skiving characteristics because of too high a melt index and a hydrocarbon resin with too high a melt point.

| | |
|---|---|
| Amorphous Polypropylene | 50.0% |
| Hydrogenated aliphatic hydrocarbon resin (melt point = 100° C.) | 20.0 |
| Polyethylene Homopolymer (melt point = 106° C.) | 30.0 |
| | 100.0 |

The above formula was tacky and lacked strength.

I claim:

1. A hot-melt applicator tip comprising a tubular shaft portion and a distal end portion in which a slot is located, the slot having a width of about 0.01" to about 0.03" and a length of about 0.15" to about 0.5", the length of the slot is greater than the width of the distal end portion, the distal end portion comprising two beveled surfaces, the slot being disposed between the two beveled surfaces, the angle between the two beveled surfaces being about 80° to about 100°, a portion of the two beveled surfaces intersecting along a line, the line forming an angle of about 40' to about 60' from a line perpendicular to the axis of the tubular shaft portion.

* * * * *